US012164893B2

United States Patent
Pope et al.

(10) Patent No.: US 12,164,893 B2
(45) Date of Patent: Dec. 10, 2024

(54) COMPILATION FOR SYNCHRONOUS PROCESSOR

(71) Applicant: Google LLC, Mountain View, CA (US)

(72) Inventors: Reiner Pope, Mountain View, CA (US); Andrew Pritchard, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/636,579

(22) PCT Filed: Aug. 21, 2020

(86) PCT No.: PCT/US2020/047520
§ 371 (c)(1),
(2) Date: Feb. 18, 2022

(87) PCT Pub. No.: WO2021/035187
PCT Pub. Date: Feb. 25, 2021

(65) Prior Publication Data
US 2022/0276847 A1    Sep. 1, 2022

Related U.S. Application Data
(60) Provisional application No. 62/890,495, filed on Aug. 22, 2019.

(51) Int. Cl.
G06F 8/41 (2018.01)
G06F 9/48 (2006.01)
(52) U.S. Cl.
CPC .............. *G06F 8/458* (2013.01); *G06F 8/433* (2013.01); *G06F 9/4881* (2013.01)
(58) Field of Classification Search
CPC ......... G06F 8/458; G06F 8/433; G06F 9/4881
(Continued)

(56) References Cited

U.S. PATENT DOCUMENTS
7,523,441 B2    4/2009   Peterson et al.
7,734,895 B1 *  6/2010   Agarwal .................. G06F 8/52
                                                            712/15
(Continued)

FOREIGN PATENT DOCUMENTS
CN    102326126    1/2012
CN    103019656    4/2013
(Continued)

OTHER PUBLICATIONS
Akopyan, Filipp, et al. "Truenorth: Design and tool flow of a 65 mw 1 million neuron programmable neurosynaptic chip." IEEE transactions on computer-aided design of integrated circuits and systems 34.10 (2015):pp. 1537-1557. (Year: 2015).*
Semeraro, Greg, et al. "Dynamic frequency and voltage control for a multiple clock domain microarchitecture." 35th Annual IEEE/ACM International Symposium on Microarchitecture, 2002.(Micro-35). Proceedings . . . IEEE, 2002.pp.356-367 (Year: 2002).*
(Continued)

*Primary Examiner* — Satish Rampuria
(74) *Attorney, Agent, or Firm* — Fish & Richardson P.C.

(57) ABSTRACT

Methods, systems, and apparatus, including computer programs encoded on computer storage media, for compiling latency insensitive programs for a synchronous processor. One of the methods includes receiving an intermediate representation of a program specifying operations to be performed by a plurality of respective components of a synchronous processor, wherein the intermediate representation assigns, to each operation of the plurality of operations, a respective clock cycle value at which the operation is scheduled to be executed by the synchronous processor. The intermediate representation is processed to generate a respective update window for each operation in the intermediate representation requiring a hardware configuration update, wherein the update window specifies a time range during which a configuration update instruction can be executed to effectuate the hardware configuration update. Configuration update instructions are scheduled to occur
(Continued)

during one or more update windows and according to the configuration constraints of the synchronous processor.

17 Claims, 6 Drawing Sheets

(58) Field of Classification Search
USPC .................................................. 717/120–178
See application file for complete search history.

(56) References Cited

U.S. PATENT DOCUMENTS

| | | | | |
|---|---|---|---|---|
| 7,849,465 | B2* | 12/2010 | Zou | G06F 9/3851 |
| | | | | 718/104 |
| 8,473,926 | B2* | 6/2013 | Metzgen | G06F 30/34 |
| | | | | 717/131 |
| 8,533,515 | B2 | 9/2013 | Lakshminarayanan et al. | |
| 9,785,587 | B2 | 10/2017 | Jan et al. | |
| 10,592,394 | B2* | 3/2020 | O'Dowd | G06F 11/3636 |
| 2003/0028864 | A1* | 2/2003 | Bowen | G06F 8/48 |
| | | | | 717/141 |
| 2003/0046671 | A1* | 3/2003 | Bowen | G06F 30/30 |
| | | | | 717/141 |
| 2005/0149697 | A1* | 7/2005 | Enright | G06F 9/4843 |
| | | | | 712/228 |
| 2006/0004997 | A1* | 1/2006 | Mykland | G06F 9/30178 |
| | | | | 712/244 |
| 2010/0122105 | A1* | 5/2010 | Arslan | G06F 15/7867 |
| | | | | 712/E9.016 |
| 2013/0339328 | A1 | 12/2013 | Greiner et al. | |

FOREIGN PATENT DOCUMENTS

| | | |
|---|---|---|
| CN | 107980118 | 5/2018 |
| JP | 6253065 | 12/2017 |
| KR | 10-2015-0065865 | 6/2015 |
| TW | I531896 | 5/2016 |
| WO | WO 2021035187 | 2/2021 |

OTHER PUBLICATIONS

Semeraro, Greg, et al. "Energy-efficient processor design using multiple clock domains with dynamic voltage and frequency scaling." Proceedings Eighth International Symposium on High Performance Computer Architecture. IEEE, 2002.pp. 1-12 (Year: 2002).*
Carloni, Luca P., Kenneth L. McMillan, and Alberto L. Sangiovanni-Vincentelli. "Theory of latency-insensitive design." IEEE Transactions on computer-aided design of integrated circuits and systems 20.9 (2001): pp. 1059-1076. (Year: 2001).*
Linder, Daniel H., and J. H. Harden. "Phased logic: Supporting the synchronous design paradigm with delay-insensitive circuitry." IEEE Transactions on Computers 45.9 (1996): pp. 1031-1044. (Year: 1996).*
Carloni, Luca P. "From latency-insensitive design to communication-based system-level design." Proceedings of the IEEE 103.11 ( 2015): pp. 2133-2151. (Year: 2015).*
International Preliminary Report on Patentability in International Appln. No. PCT/US2020/047520, mailed on Mar. 3, 2022, 11 pages.
International Search Report and Written Opinion in International Appln. No. PCT/US2020/047520, mailed on Nov. 23, 2020, 18 pages.
Köhler et al., "Improving code efficiency for reconfigurable VLIW processors." Parallel and Distributed Processing Symposium, International. vol. 3. IEEE Computer Society, Apr. 2002.
Office Action in Taiwan Appln. No. 109128681, dated Jun. 3, 2021.
Panainte et al., "The Molen Compiler for Recongfigurable Processors" ACM Transactions on Embedded Computing Systems, vol. 6. No. 1, Feb. 2007, 21 pages.
Office Action in Japanese Appln. No. 2022-511312, dated Jun. 12, 2023, 15 pages (with English translation).
Notice of Allowance in Japanese Appln. No. 2022-511312, mailed on Mar. 18, 2024, 5 pages (with English translation).
Office Action in Korean Appln. No. 10-2022-7005612, mailed on Mar. 28, 2024, 16 pages (with English translation).
Notice of Allowance in Korean Appln. No. 10-2022-7005612, mailed on Jul. 8, 2024, 4 pages (with English translation).

* cited by examiner

COMPILATION FOR SYNCHRONOUS PROCESSOR

CROSS-REFERENCE TO RELATED APPLICATIONS

This application is a National Stage Application under 35 U.S.C. § 371 and claims the benefit of International Application No. PCT/US2020/047520, filed Aug. 21, 2020, which claims priority to U.S. Application No. 62/890,495, filed Aug. 22, 2019, entitled COMPILATION FOR SYNCHRONOUS PROCESSOR. The disclosures of the foregoing applications are incorporated herein by reference in their entirety.

BACKGROUND

This specification relates to compiler techniques for synchronous integrated circuit accelerators.

A synchronous integrated circuit accelerator is an application-specific integrated circuit (ASIC) that is designed for performing highly parallel synchronous operations. The parallelism is achieved by integrating many different independent processing elements that can execute concurrently. Such devices are well-suited for accelerating inference passes through neural networks, e.g., with each of the independent processing elements performing a different multiplication or addition of layer inputs with weights.

For brevity, in this specification such devices will be referred to as synchronous processors or synchronous chips. In practice, such devices may be implemented using multiple wafers of silicon, e.g., using die stacking or silicon interposers.

In this specification, a processor being synchronous means that the operations performed by the independent processing units do not perform branched execution, e.g., as in an if/else statement of an imperative program. Rather, the operations can fully scheduled in advance either partially or fully. For example, the operations of some synchronous processors must be scheduled down to the individual cycle level, meaning that every operation of every processing element is assigned to a particular slot in the execution cycles.

This complexity makes programming synchronous processors highly error prone. For example, a user bug that introduces an unexpected delay of a single cycle can cause the resulting computation to be incorrect or undefined, which can mean that multiple passes of the same program can generate different results.

SUMMARY

This specification describes techniques for compiling programs written for synchronous processors. The techniques described below relate to scheduling data instructions that manipulate data flowing on the processor. The techniques described below also relate to automatically generating and scheduling configuration update instructions that are executed by the control hardware of the processor.

Particular embodiments of the subject matter described in this specification can be implemented so as to realize one or more of the following advantages. A system can automatically generate a completely scheduled intermediate representation for a synchronous processor from a latency insensitive input program. This greatly reduces manual errors in programming synchronous processors. In addition, the latency insensitive program can be reused for different hardware configurations without being rewritten. The intermediate representation allows configuration update instructions to be fully scheduled and provides a compiler with the ability to raise errors when no possible output program exists.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
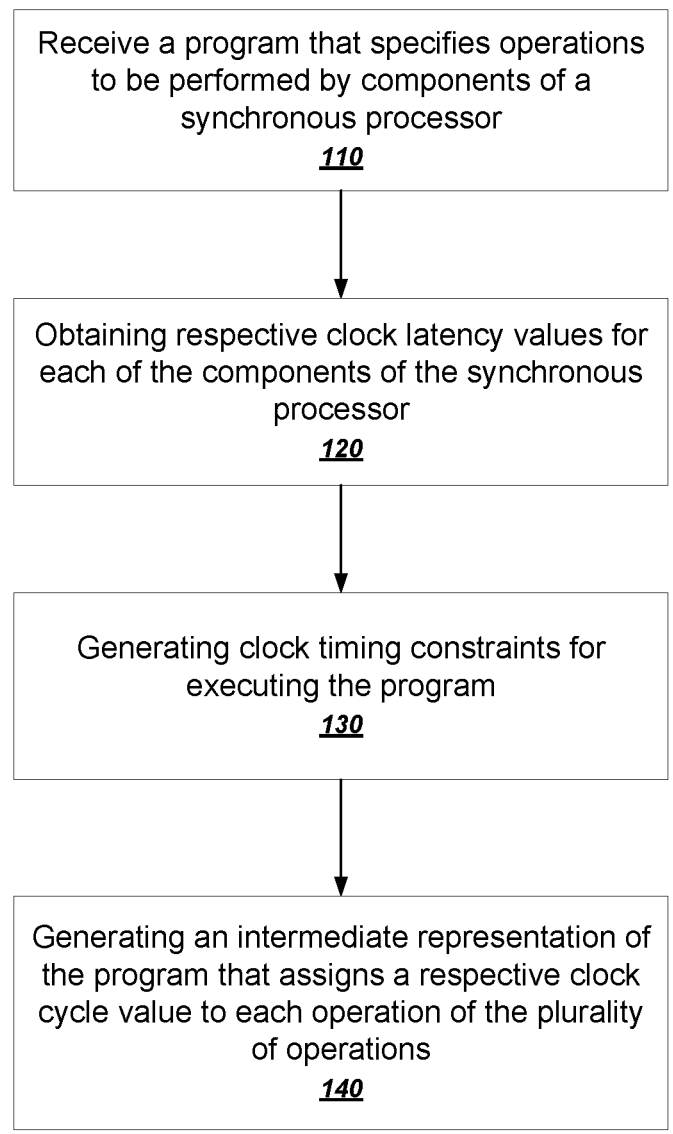
FIG. 1 is a flowchart of an example process for generating an intermediate representation of an input program.

FIG. 1 is a flowchart of an example process for generating an intermediate representation of an input program. For convenience, the process will be described as being performed by a system of one or more computers, located in one or more locations, and programmed appropriately in accordance with this specification.

The system receives a program that specifies operations to be performed by components of a synchronous processor (110). In general, each statement of the program can specify one or more input variables, an output variable, and an operation. The program does not need to specify latency or timing information about when the operations will be executed. Instead, the system can then use the variable names in order to determine timing constraints for executing the program on the synchronous processor.

TABLE 1 lists an example program that multiplies two values read from RAM, adds the result to a third value read from RAM, and writes the result to RAM.

TABLE 1

| Line | Statements |
| --- | --- |
| 1 | proc addr -> do: |
| 2 | x <- readRegFileRAM( ) 0 -< addr |
| 3 | y <- readRegFileRAM( ) 1 -< addr |
| 4 | c <- readScalingRAM 42 -< addr |
| 5 | cy <- mul -< (c,y) |
| 6 | cyx <- add -< (cy, x) |
| 7 | writeRegFileRAM 3 -< cyx |

The arrows syntax, e.g., ("←name←") identifies subprograms that are supplied on-chip parameters from the right and assign their on-chip results to the name on the left. In the case of a synchronous processor, the arrow syntax can be used to refer to particular hardware components on the processor. In this example, "addr" is being used an input to the whole composite program as declared by "proc addr→ . . . " on line 1. In this case, "addr" identifies which processor component's RAMs to read from in each of the three read operations. For example, the RAMs represented by "addr" can compute and store partial sums to be used by a next stage of the program.

Notably, the example program is latency insensitive, meaning that does not specify any information about the latency of the components and does not specify the timing required for executing each operation. This means that, unlike traditional programs, the program in TABLE 1 does not require the statements to be executed sequentially. In fact, it is expected that the statements will often be executed in a different order or in parallel depending on the properties of the synchronous processor.

The system obtains respective clock latency values for each of the components of the synchronous processor (120). The system can maintain a mapping, e.g., a table, between (1) each operation recognized by a keyword or function in the program and (2) respective clock latency values that represent a number of clock cycles each operation takes on the synchronous processor. This arrangement allows the same latency insensitive program to be compiled for different underlying hardware designs. This is advantageous because if the design of the underlying hardware changes some of the component latency values, the same program can still be compiled for the new design of the hardware.

The system generates clock timing constraints for executing the program (130). The clock timing constraints specify when particular operations must happen relative to other operations. In general, reading values must happen at least one clock cycle before the values are used. For example, a multiply operation requiring two inputs has the constraint that the two inputs must be read at least one clock cycle before the multiply operation begins. Thus, for example, the multiply operation on line 5 of TABLE 1 must commence at least one clock cycle after each of the read operations on lines 3 and 4. In addition, consecutive operations should not overlap in time. The system can generate the constraints by using variable names in the program to determine which operations must happen after others.

Figure 2:
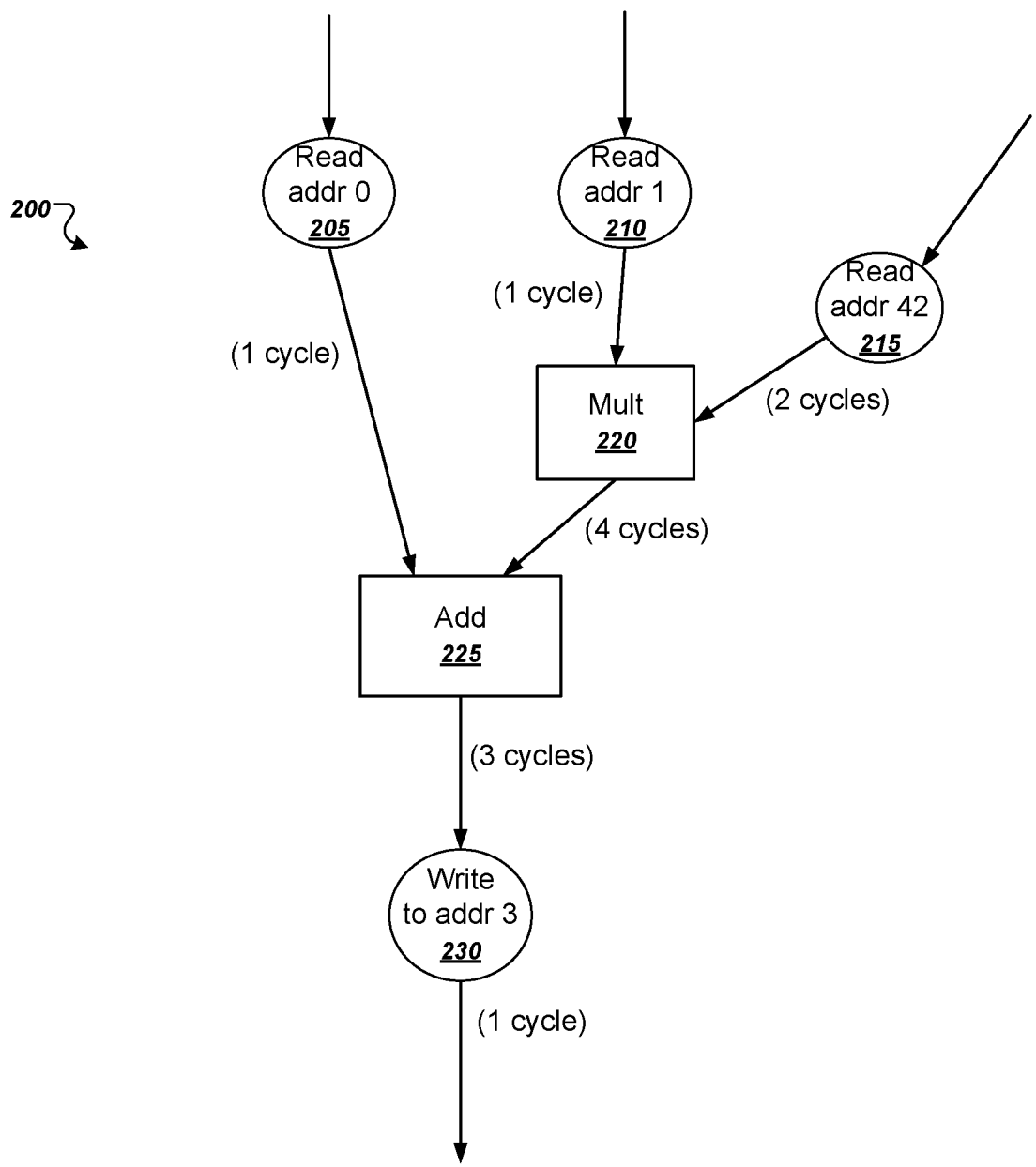
FIG. 2 is a graph representation of an example program.

FIG. 2 is a graph representation 200 of an example program. The graph representation 200 corresponds to the example program listed in TABLE 1. The graph representation 200 has nodes that each correspond to one of the operations in the program. Thus, the graph has a read node 205 representing the read command on line 2, a read node 210 representing the read command on line 3, a read node 215 representing the read command on line 4, a multiply node 220 representing the multiply command on line 5, an add node 225 representing the add command on line 6, and a write node 230 representing the write command on line 7.

To generate the clock timing constraints, the system can traverse the program, or equivalently, the edges in the graph representation, to determine dependencies based on the variable names. The system can then compute the required clock latency values for the discovered dependencies between operations. For example, if the multiply operation on line 4 takes 4 cycles, the system can generate the constraint that the add operation on line 5 both depends on the output of the multiply operation and should not start until 4 cycles after the multiply operation starts.

As another example, the add operation on line 6 depends on the variable x, which is read on line 2. Therefore, there is a dependency between the operation on line 6 and the operation on line 2.

As shown in FIG. 2, the two read nodes 205 and 210 have a latency of 1 cycle. The read node 215 has a latency of 2 cycles. The multiply node 220 has a latency of 4 cycles, the add node 225 has a latency of 3 cycles, and the write node 230 has a latency of 1 cycle.

As shown in FIG. 1, the system generates an intermediate representation of the program that assigns a respective clock cycle value to each operation of the plurality of operations (140). The intermediate representation is intermediate in the sense that it is lower-level code than the user program, but is generally not so low that it can be directly executed by the synchronous processor.

The system can generate the intermediate representation by starting at any arbitrary operation in the program and then traverse the dependencies and latencies. For example, the system can start at the read node 210 and assign that read operation to be executed at an arbitrary starting cycle number, e.g., cycle 0.

The system can then use the dependency between the node 210 and the node 220 as well as the 1 cycle latency of the node 210 to assign the subsequent multiply operation to be executed at cycle 1.

The system can then examine the other dependency of the multiply node 220, which is the read node 215. The read node 215 represents reading from a scaling RAM having different characteristics than the RAM used for read node 210. Therefore, the latency is different—2 cycles instead of 1 cycle. The system thus assigns the read operation of the read node 215 to be executed two cycles before the multiply operation of the multiply operation 220.

This results in a negative cycle value of −1. However, the values in the intermediate representation represent only relative cycle times, and therefore, negative values are allowed, and sometimes even expected or inevitable.

The system can then examine the dependency of the add node 225 corresponding to the add operation. The latency between the multiply node 220 and the add node 225 is 4 cycles, and thus the system assigns the add operation to be executed 4 cycles after the multiply operation, e.g., at cycle 5.

The system can then examine the other dependency on the add node 225, which is the read node 205. Because of the 1 cycle latency of the read node 205, the system can assign the read operation to be executed one cycle before the add node 225. Therefore, the system assigns a cycle value of 4 for the read operation.

Lastly, the system examines the dependencies of the add node 225, which in this example is the write node 230 corresponding to the write operation. Because of the 3 cycles of latency of the add node 225, the system assigns a cycle value of 8 to the write operation.

The intermediate representation thus associates a respective cycle time value with each operation in the program. The system can use any appropriate data structure to store the intermediate representation. For example, the system can store a mapping between (1) cycle time values and (2) instruction identifiers, nodes in a graph, instruction text, or some other representation of the operation.

An example intermediate representation resulting from processing the graph illustrated in FIG. 2 values is shown in TABLE 2:

TABLE 2

| Cycle Value | Operation |
| --- | --- |
| −1 | c <− readScalingRAM 42 −< addr |
| 0 | y <− readRegFileRAM( ) 1 −< addr |
| 1 | cy <− mul −< (c,y) |

TABLE 2-continued

| Cycle Value | Operation |
| --- | --- |
| 4 | x <- readRegFileRAM( ) 0 -< addr |
| 5 | cyx <- add -< (cy, x) |
| 8 | writeRegFileRAM 3 -< cyx |

Unlike the original input program, the statements in TABLE 2 do specify a time ordering of the operations that will be executed by the synchronous processor. This ordering of operations is highly likely to succeed on the actual hardware because all of the scheduling an latency information has been generated automatically down to the cycle level.

In some cases, no correct intermediate representation exists for an the input program. In such cases, the system can raise an error indicating the program cannot be compiled correctly. This can exist, for example, when the dependencies in the input program form a cycle. This can also happen when a value cannot be generated quickly enough by the hardware to be available when it is needed.

As another example, any kind of operation that has multiple inputs derived from the same intermediate value might be ill-formed. If a value "a" is produced at cycle 0, value "b" is computed from "a" in 3 cycles, value "c" is computed from value "a" in 2 cycles, and a program attempts to multiply "b" and "c" together without addressing the latency difference, there is no correct way to schedule those operations. Instead, a user may have to add code to communicate "c" into the next cycle, e.g. by using a RAM or a delay register.

Although the intermediate representation specifies a cycle-level schedule for the operations to be performed by the synchronous processor, the compiler can emit additional instructions in order to actually execute the program on the components of the synchronous processor. In particular, the compiler may need to generate configuration update instructions that specify changes in the data pathways between the processing components of the synchronous processor. This is particularly the case when the instructions have polyhedral loop semantics, meaning that each sequence of instructions will potentially be executed multiple times. Thus, for example, the program semantics can specify that a particular read operation should read from a particular register on 10 consecutive iterations and then read from a different particular register on the next 10 iterations.

In order to switch from one configuration to another, the processor can issue configuration update instructions that change the inputs on multiplexors in the data pathways between the processor components.

Figure 3:
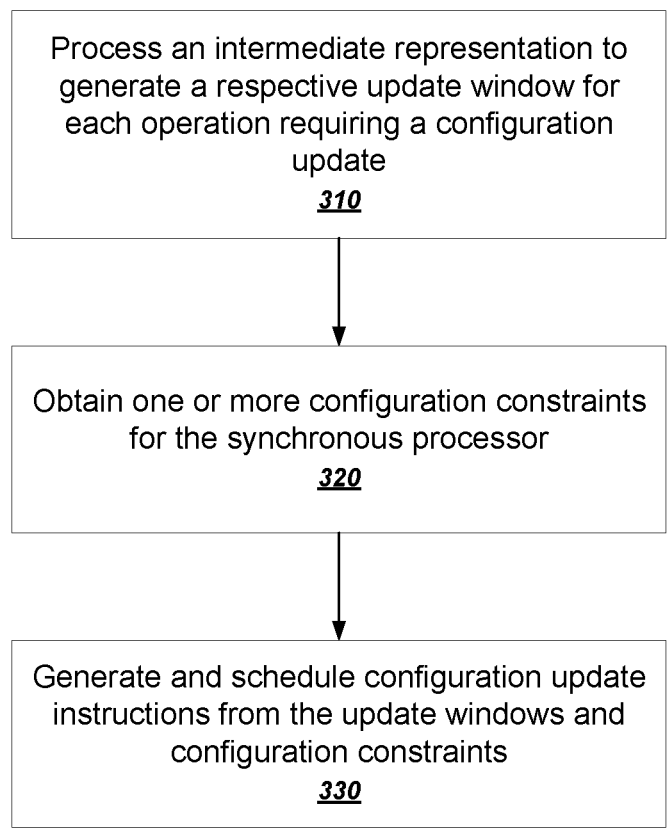
FIG. 3 is a flowchart of an example process for emitting configuration update instructions for an intermediate representation.

FIG. 3 is a flowchart of an example process for emitting configuration update instructions for an intermediate representation. For convenience, the process will be described as being performed by a system of one or more computers, located in one or more locations, and programmed appropriately in accordance with this specification.

The system processes an intermediate representation to generate a respective update window for each operation (310). The system processes the instructions in the intermediate representation and generates, for each instruction requiring a configuration update, a respective update window that represents a time range during which a corresponding configuration update instruction needs to be executed. In some implementations, in the absence of a configuration update instruction being received, the processor will use the same configuration the next time the operation is executed.

The system obtains one or more configuration constraints for the synchronous processor (320). One of the natural configuration constraints for the control hardware of the synchronous processor is how many configuration update instructions can be executed on a single cycle. For example, some synchronous processors may support executing only 1, 2, 4, or 8, configuration update instructions simultaneously.

Other configuration constraints can include on which cycles configuration instructions can be executed. For example, in some implementations, a configuration update instruction can only be executed on every Nth cycle, e.g., where N is 2, 4, or 8.

Other configuration constraints can include power domain constraints that specify how many configuration updates can be executed per power domain of the processor.

The system generates and schedules configuration update instructions from the update windows and configuration constraints (330). Each configuration update instruction can alter how instructions behave on a different loop iteration. For example, a configuration update instruction can change the register of a register read operation. As another example, a configuration update instruction can change the argument of a multiplexor in a data pathway of the synchronous processor. This can cause a downstream operation to use a different argument on a subsequent loop iteration. In general, each configuration update instruction is scheduled to occur within one of the update windows generated from processing the intermediate representation. The system can use any appropriate constraint solving procedure to schedule all required configuration update instructions within the available update windows. An example constraint solving example will now be described.

Figure 4:
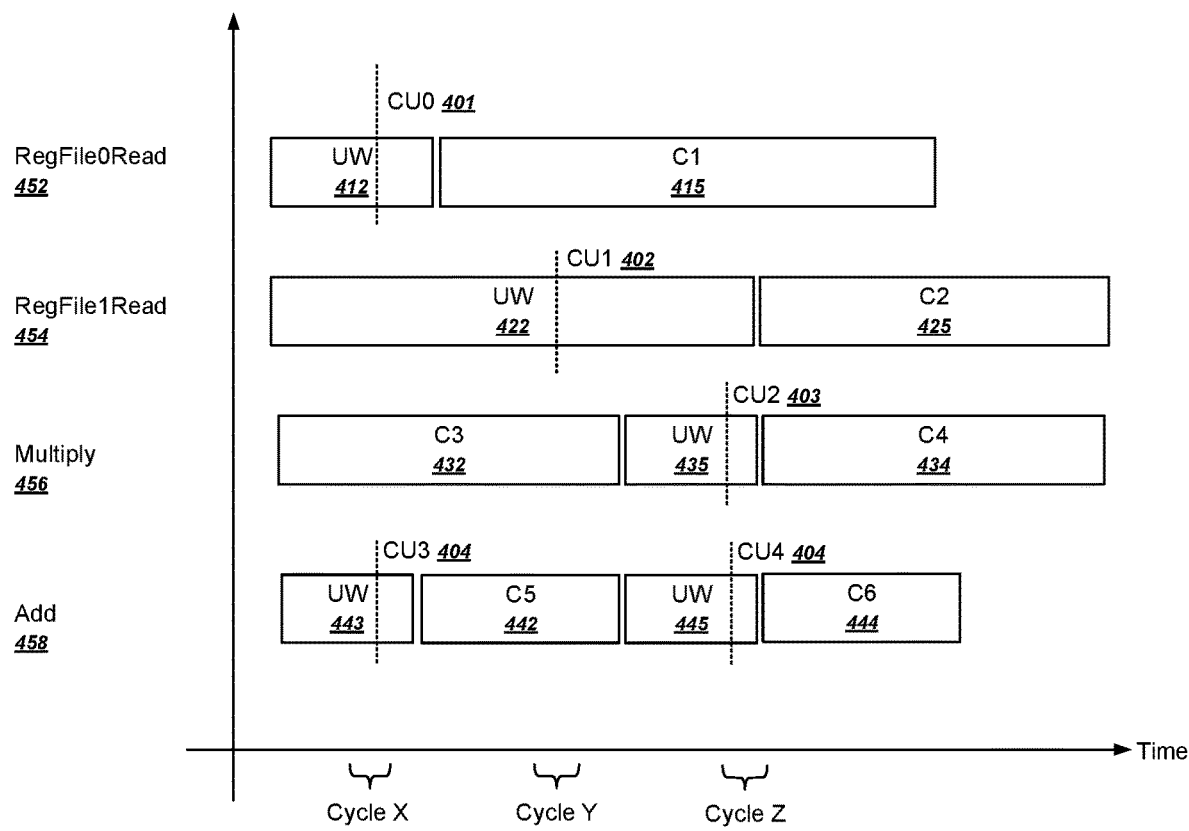
FIG. 4 is a diagram illustrating scheduling configuration update instructions given constraints of a synchronous processor.

FIG. 4 is a diagram illustrating scheduling configuration update instructions given constraints of a synchronous processor. FIG. 4 has a horizontal time axis, along which are illustrated configuration windows and update windows. This is information that the compiler can generate after processing the intermediate representation of a program as described above.

The configuration windows represent time ranges that particular instructions will be executed by the processor having a particular configuration. The update windows represent time ranges that, for particular instructions, the configuration is unimportant or ignored.

Thus, the RegFile0Read instruction 452 is illustrated as having a first update window 412 and a configuration window 415 in which the instruction 452 will be executed using a configuration named C1. During the configuration window 415, the processor will execute the instruction 452 once per cycle repeatedly using the configuration C1.

Similarly, the RegFile1Read instruction 454 is illustrated as having a second update window 422 and a configuration window 425 in which the instruction 454 will be executed using a configuration named C2. During the configuration window 415, the processor will execute the instruction 452 once per cycle repeatedly using the configuration C2. Notably, the second update window 422 is much longer than the first update window 412, which means that there is more flexibility for issuing a configuration update instruction for the RegFile1Read instruction 454.

The multiply instruction 456 is illustrated as having a first configuration window 432 and a second configuration window 434. During each of these configuration windows, the processor can execute the multiple cycles of a multiplication operation as opposed to repeating the operation as for the case of the register read instructions described above. The multiply instruction has an update window 435. For example, the update window 435 could change the data pathways in order to change an operand of the multiplication operation.

The add instruction 458 is also illustrated as having two configuration windows 442 and 444 during which the multiple cycles of the add operation will be performed, as well as two update windows 443 and 445 during which one or more operands of the add instruction can be changed.

The compiler can use the update windows to determine a schedule of configuration update instructions that satisfies the constraints of the processor. For this example, the constraints are assumed to be that the processor can execute configuration update instructions only on Cycle X, Cycle Y, and Cycle Z. In addition, the processor has an additional constraint that only two configuration update instructions can be executed on a single cycle.

Cycle X overlaps with three update windows. Cycle Y overlaps with one update window. Cycle Z also overlaps with three update windows. Therefore, the compiler can select at most two out of the three overlapping update windows on Cycle X and Cycle Z.

The compiler can choose any appropriate constraint solving procedure to determine how to schedule the five configuration updates. For example, the compiler can start with the most constrained update windows and work toward the least constrained. If no solutions can be found, the compiler can raise an error that the program cannot be executed on the processor.

As shown in FIG. 4, the most constrained update windows are the ones that overlap with only a single one of Cycle X, Cycle Y, or Cycle Z. There are four such windows that overlap with only a single cycle: UW 412, UW 435, UW 443, and UW 445.

Therefore, the compiler can schedule corresponding configuration update instructions during those update windows. In other words, the compiler can schedule CU0 401 and CU3 404 during Cycle X and can schedule CU2 403 and CU4 404 during Cycle Z.

The compiler can then eliminate any cycles that already have two configuration updates from consideration for the remaining update windows. Thus, the compiler can remove Cycle X and Cycle Z from further consideration as both cycles are fully occupied by configuration update instructions.

The only remaining unassigned update window is UW422, which still overlaps with Cycle Y. Therefore, the compiler can schedule CU1 402 during Cycle Y, and the process can end because all configuration update instructions were successfully scheduled.

However, consider the case in which the second update window 422 were equal to the first update window 412. In that case, there would be no solution for the scheduling problem because at least three configuration update instructions would be scheduled for Cycle X. In that instance, the compiler could raise an error that no configuration update can be successfully scheduled.

Figure 5:
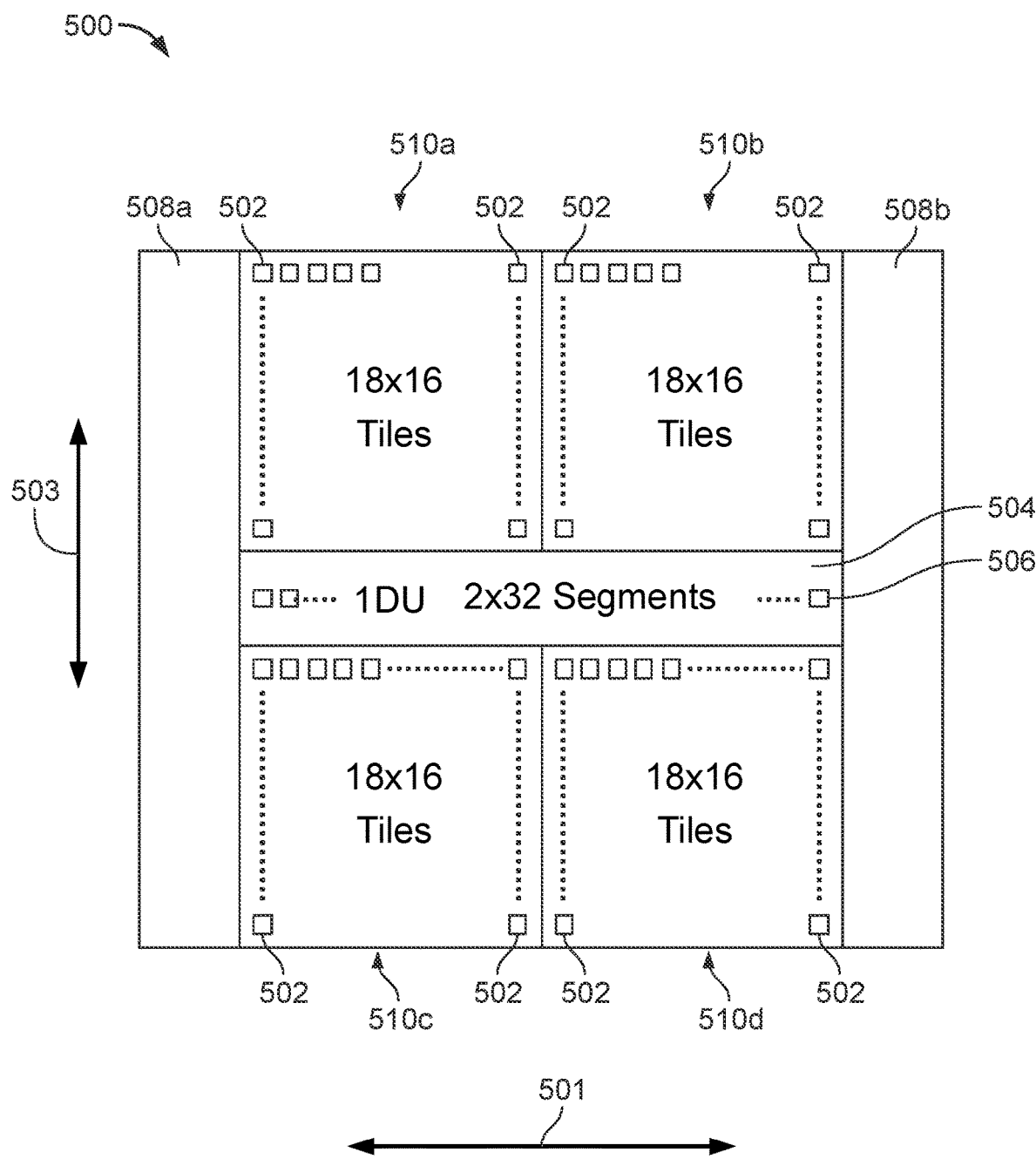
FIG. 5 is a schematic that illustrates an example of special purpose logic circuitry.

FIG. 5 is a schematic that illustrates an example of special purpose logic circuitry, in particular, an ASIC 500. The ASIC 500 includes multiple synchronous processors that for brevity will be referred to as tiles. For example, the ASIC 500 includes tiles 502, in which one or more of the tiles 502 includes special purpose circuitry configured to perform synchronous computations, such as e.g., multiplication and addition operations. In particular, each tile 502 can include a computational array of cells, in which each cell is configured to perform mathematical operations (see, e.g., the exemplary tile 200 shown in FIG. 6, and described herein).

In some implementations, the tiles 502 are arranged in a grid pattern, with tiles 502 arranged along a first dimension 501 (e.g., rows) and along a second dimension 503 (e.g., columns). For instance, in the example shown in FIG. 5, the tiles 502 are divided into four different sections (510a, 510b, 510c, 510d), each section containing 288 tiles arranged in a grid of 18 tiles down by 16 tiles across. In some implementations, the ASIC 500 shown in FIG. 5 may be understood as including a single systolic array of cells subdivided/arranged into separate tiles, in which each tile includes a subset/sub-array of cells, local memory and bus lines (see, e.g., FIG. 6).

The ASIC 500 also includes a vector processing unit 504. The vector processing unit 504 includes circuitry configured to receive outputs from the tiles 502 and compute vector computation output values based on the outputs received from the tiles 502. For example, in some implementations, the vector processing unit 504 includes circuitry (e.g., multiply circuitry, adder circuitry, shifters, and/or memory) configured to perform accumulation operations on the outputs received from the tiles 502. Alternatively, or in addition, the vector processing unit 504 includes circuitry configured to apply a non-linear function to the outputs of the tiles 502. Alternatively, or in addition, the vector processing unit 504 generates normalized values, pooled values, or both. The vector computation outputs of the vector processing units can be stored in one or more tiles. For example, the vector computation outputs can be stored in memory uniquely associated with a tile 502. Alternatively, or in addition, the vector computation outputs of the vector processing unit 504 can be transferred to a circuit external to the ASIC 500, e.g., as an output of a computation. In some implementations, the vector processing unit 504 is segmented, such that each segment includes circuitry configured to receive outputs from a corresponding collection of tiles 502 and computes vector computation outputs based on the received outputs. For instance, in the example shown in FIG. 5, the vector processing unit 504 includes two rows spanning along the first dimension 501, each of the rows including 32 segments 506 arranged in 32 columns. Each segment 506 includes circuitry (e.g., multiply circuitry, adder circuitry, shifters, and/or memory) configured to perform a vector computation, as explained herein, based on outputs (e.g., an accumulated sum) from a corresponding column of tiles 502. The vector processing unit 504 can be positioned in the middle of the grid of tiles 502 as shown in FIG. 5. Other positional arrangements of the vector processing unit 504 are also possible.

The ASIC 500 also includes a communication interface 508 (e.g., interfaces 508a, 508b). The communication interface 508 includes one or more sets of serializer/deserializer (SerDes) interfaces and a general purpose input/output (GPIO) interface. The SerDes interface is configured to receive instructions (e.g., instructions for operating controllable bus lines described below) and/or input data for the ASIC 500 and to output data from the ASIC 500 to an external circuit. For example, the SerDes interface can be configured to transmit instructions and/or input data at a rate of 32 Gbps, 56 Gbps, or any suitable data rate over the set of SerDes interfaces included within the communications interface 508. The GPIO interface is configured to provide an interface for debugging and/or bootstrapping. For example, the ASIC 500 may run a boot program when it is turned on. If the program fails, an administrator may use the GPIO interface to debug the source of the failure.

The ASIC 500 further includes multiple controllable bus lines (see, e.g., FIG. 6) configured to convey data among the communications interface 508, the vector processing unit 504, and the multiple tiles 502. Controllable bus lines include, e.g., wires that extend along both the first dimension 501 (e.g., rows) of the grid and the second dimension 503 (e.g., columns) of the grid. A first subset of the controllable bus lines extending along the first dimension 501 can be configured to transfer data in a first direction (e.g., to the right of FIG. 5). A second subset of the controllable bus lines extending along the first dimension 501 can be configured to transfer data in a second direction (e.g., to the left of FIG. 5). A first subset of the controllable bus lines extending along the second dimension 503 can be configured to transfer data in a third direction (e.g. to the top of FIG. 5). A second subset of the controllable bus lines extending along the second dimension 503 can be configured to transfer data in a fourth direction (e.g., to the bottom of FIG. 5).

Each controllable bus line includes multiple conveyer elements, such as flip-flops, that are used to convey data along the lines in accordance with a clock signal. Transferring data over a controllable bus line can include shifting, at each clock cycle, data from a first conveyer element of the controllable bus line to a second adjacent conveyer element of the controllable bus line. In some implementations, data is conveyed over the controllable bus lines upon the rising or falling edge of a clock cycle. For example, data present, at a first clock cycle, on a first conveyer element (e.g., a flip-flop) of a controllable bus line can be transferred to a second conveyer element (e.g., a flip-flop) of the controllable bus line at a second clock cycle. In some implementations, the conveyer elements can be periodically spaced apart at a fixed distance from one another. For example, in some cases, each controllable bus line includes multiple conveyer elements, with each conveyer element positioned within or proximate to a corresponding tile 502.

Each controllable bus line also includes multiple multiplexers and/or demultiplexers. A multiplexer/demultiplexer of a controllable bus line is configured to transfer data between the bus line and a component of the ASIC chip 500. For example, a multiplexer/demultiplexer of a controllable bus line can be configured to transfer data to and/or from a tile 502, to and/or from the vector processing unit 504, or to and/or from the communication interface 508. Transferring data among tiles 502, the vector processing unit 504, and the communication interface can include sending control signals to the multiplexers based on the desired data transfer to take place. The control signals can be stored in registers coupled directly to the multiplexer and/or demultiplexers. The value of the control signal then may determine, e.g., what data is transferred from a source (e.g., memory within a tile 502 or a vector processing unit 504) to a controllable bus line or, alternatively, what data is transferred from the controllable bus line to a sink (e.g., memory within a tile 502 or a vector processing unit 504).

The controllable bus lines are configured to be controlled on a local level, such that each tile, vector processing unit, and/or communication interface includes its own set of control elements for manipulating the controllable bus lines passing through that tile, vector processing unit, and/or communication interface. For example, each tile, 1D vector processing unit, and communication interface may include a corresponding set of conveyer elements, multiplexers and/or demultiplexers for controlling data transfer to and from that tile, 1D vector processing unit, and communication interface.

To minimize latency associated with operations of the ASIC chip 500, the tiles 502 and vector processing unit 504 can be positioned to reduce the distance data travels among the various components. In a particular implementation, both the tiles 502 and communication interface 508 can be segregated into multiple sections, with both the tile sections and the communication interface sections being arranged such that the maximum distance data travels between a tile and a communication interface is reduced. For instance, in some implementations, a first group of tiles 502 can be arranged in a first section on a first side of the communications interface 508, and a second group of tiles 502 can be arranged in a second section on a second side of the communication interface. As a result, the distance from a communication interface to the furthest tile may be cut in half compared to a configuration in which all of the tiles 502 are arranged in a single section on one side of the communication interface.

Alternatively, the tiles may be arranged in a different number of sections, such as four sections. For instance, in the example shown in FIG. 5, the multiple tiles 502 of ASIC 500 are arranged in multiple sections 510 (510a, 510b, 510c, 510d). Each section 510 includes a similar number of tiles 502 arranged in a grid pattern (e.g., each section 510 can include 256 tiles arranged in 16 rows and 16 columns). The communication interface 508 also is divided into multiple sections: a first communication interface 508a and a second communication interface 508b arranged on either side of the sections 510 of tiles 502. The first communication interface 508a can be coupled, through controllable bus lines, to the two tile sections 510a, 510c on the left side of the ASIC chip 500. The second communication interface 508b can be coupled, through controllable bus lines, to the two tile sections 510b, 510d on the right side of the ASIC chip 500. As a result, the maximum distance data travels (and thus the latency associated with the data propagation) to and/or from a communication interface 508 can be halved compared to an arrangement in which only a single communication interface is available. Other coupling arrangements of the tiles 502 and communication interfaces 508 are also possible to reduce data latency. The coupling arrangement of the tiles 502 and communication interface 508 can be programmed by providing control signals to the conveyer elements and multiplexers of the controllable bus lines.

In some implementations, one or more tiles 502 are configured to initiate reading and writing operations with respect to controllable bus lines and/or other tiles within the ASIC 500 (referred to herein as "control tiles"). The remaining tiles within the ASIC 500 can be configured to perform computations based on the input data (e.g., to compute layer inferences). In some implementations, the control tiles include the same components and configuration as the other tiles within the ASIC 500. The control tiles can be added as an extra tile or tiles, an extra row or rows, or an extra column or columns of the ASIC 500. For example, for a symmetric grid of tiles 502, in which each tile 502 is configured to perform a computation on input data, one or more additional rows of control tiles can be included to handle reading and writing operations for the tiles 502 performing computations on the input data. For instance, each section 510 includes 18 rows of tiles, where the last two rows of tiles may include control tiles. Providing separate control tiles increases, in some implementations, the amount of memory available in the other tiles used to perform the computations. Separate tiles dedicated to providing control as described herein are not necessary, however, and in some cases, no separate control tiles are provided. Rather, each tile may store in its local memory instructions for initiating reading and writing operations for that tile.

Furthermore, while each section 510 shown in FIG. 5 includes tiles arranged in 18 rows by 16 columns, the number of tiles 502 and their arrangement in a section can be different. For example, in some cases, the sections 510 may include an equal number of rows and columns.

Furthermore, although shown in FIG. 5 as divided into four sections, the tiles 502 can be divided into other different groupings. For example, in some implementations, the tiles 502 are grouped into two different sections, such as a first section above the vector processing unit 504 (e.g., nearer the top of the page shown in FIG. 5) and a second section below the vector processing unit 504 (e.g., nearer to the bottom of the page shown in FIG. 5). In such an arrangement, each section may contain, e.g., 576 tiles arranged in a grid of 18 tiles down (along direction 503) by 32 tiles across (along direction 501). Sections may contain other total numbers of tiles and may be arranged in different sized arrays. In some cases, the divisions between sections are delineated by hardware features of the ASIC 500. For example, as shown in FIG. 5, sections 510a, 510b may be separated from sections 510c, 510d by the vector processing unit 504.

Latency also may be reduced by centrally locating the vector processing unit 504 relative to the tile sections 510. In some implementations, a first half of the tiles 502 are arranged on a first side of the vector processing unit 504, and a second half of the tiles 502 are arranged on a second side of the vector processing unit 504.

For example, in the ASIC chip 500 shown in FIG. 5, the vector processing unit 504 includes two sections (e.g., two rows), each of which includes a number of segments 506 that matches the number of columns of tiles 502. Each segment 506 can be positioned and configured to receive an output, such as an accumulated sum, from a corresponding column of tiles 502 within a section 510 of tiles. In the example shown in FIG. 5, the tile sections 510a, 510b positioned on a first side of the vector processing unit 504 (e.g., above the vector processing unit 504) can be coupled, through controllable bus lines, to the top row of segments 506. The tile sections 510c, 510d positioned on a second side of the vector processing unit 504 (e.g., below the vector processing unit 504) can be coupled, through controllable bus lines, to the bottom row of segments 506. Furthermore, each tile 502 within the first half above the processing unit 504 can be positioned at a same distance from the vector processing unit 504 as a respective tile 502 within the second half below the processing unit 504, such that there is no difference in overall latency between the two halves. For instance, the tiles 502 in row i in the first section 510a (where the variable i corresponds to the row position) can be positioned at the same distance away from vector processing unit 504 as the tiles 502 in row m−1−i in a second section of tiles (e.g., the section 510c) (where m represents the total number of rows in each section, and assuming rows are incremented along the same direction in both sections).

Configuring the tile sections 510 in this manner can halve the distance data travels (and thus the latency associated with the data propagation) to and/or from the vector processing unit 504 compared to an arrangement in which the vector processing unit 504 is positioned at a far end (e.g., the bottom) of all the tiles 502. For instance, the latency associated with receiving an accumulated sum through a column of tiles 502 from section 510a can be half the latency associated with receiving an accumulated sum through a column of tiles 502 from sections 510a and 510c. The coupling arrangements of the tiles 502 and the vector processing unit 504 can be programmed by providing control signals to the conveyer elements and multiplexers of the controllable bus lines.

During operation of the ASIC chip 500, activation inputs may be shifted between tiles. For example, activation inputs can be shifted along the first dimension 501. In addition, outputs from computations performed by the tiles 502 (e.g., outputs of computations performed by computational array within the tile 502) can be shifted along the second dimension 503 between tiles.

In some implementations, the controllable bus lines can be physically hardwired to cause data to skip tiles 502 to reduce latency associated with the operations of the ASIC chip 500. For example, an output of a computation performed by a first tile 502 can be shifted along the second dimension 503 of the grid to a second tile 502 positioned at least one tile away from the first tile 502, thus skipping the tile in between. In another example, an activation input from a first tile 502 can be shifted along the first dimension 501 of the grid to a second tile 502 positioned at least one tile away from the first tile 502, thus skipping the tile in between. By skipping at least one tile when shifting the activation input or the output data, the overall data path length can be reduced, such that the data is transferred faster (e.g., there is no need to utilize a clock cycle to store data at the skipped tile), and latency is reduced.

In an example implementation, each tile 502 within each column of section 510a can be configured, through the controllable bus lines, to pass output data along the second dimension 503 toward the vector processing unit 504. The tiles 502 within each column can be further configured to pass the data toward the vector processing unit 504 by skipping the next adjacent tile (e.g., through physical hardwiring of the controllable bus lines between tiles). That is, a tile 502 at a position (i, j)=(0, 0) in the first section 510a (where the variable i corresponds to the row position and the variable j corresponds to the column position) can be hardwired to pass output data to a tile 502 at a position (i, j)=(2, 0); similarly, the tile 502 at a position (i, j)=(2, 0) in the first section 510a can be hardwired to pass output data to a tile 502 at a position (i, j)=(4, 0), and so forth. The last tile that is not skipped (e.g., the tile 502 located at position (i, j)=(16, 0)) passes output data to the vector processing unit 504. For a section 510 having 18 rows of tiles, such as the example shown in FIG. 5, the tile skipping ensure that all tiles within a section 510 are at most 9 "tile hops" away from the vector processing unit 504, thus improving the ASIC chip 500 performance by reducing the data path length and resulting data latency by half.

In another example implementation, each tile 502 within each row of sections 510a, 510c and within each row of sections 510b, 510d can be configured, through the controllable bus lines, to pass activation inputs along the first dimension 501. For example, some tiles within the sections 510a, 510b, 510c, 510d can be configured to pass activation inputs toward a center of the grid 500 or toward the communication interfaces 508. The tiles 502 within each row can be further configured skip adjacent tiles, e.g., by hardwiring the controllable bus lines between tiles. For example, a tile 502 at a position (i, j)=(0, 0) in the first section 510a (where the variable i corresponds to the row position and the variable j corresponds to the column position) can be configured to pass activation inputs to a tile 502 at a position (i, j)=(0, 2); similarly, a tile 502 at a position (i, j)=(0, 2) in the first section 510a can be configured to pass activation inputs to a tile 502 at a position (i, j)=(0, 4), and so forth. In some cases, the last tile that is not skipped (e.g., the tile 502 located at position (i, j)=(0, 14)) does not pass the activation input on to another tile.

Similarly, tiles that are skipped may pass activation inputs in the opposite direction. For example, a tile 502 at a position (i, j)=(0, 15) in the first section 510a (where the variable i corresponds to the row position and the variable j corresponds to the column position) can be configured to activation inputs to a tile 502 at a position (i, j)=(0, 13); similarly, a tile 502 at a position (i, j)=(0, 13) in the first section 510a can be configured to pass activation inputs to a tile 502 at a position (i, j)=(0, 11), and so forth. In some cases, the last tile that is not skipped (e.g., the tile 502 located at position (i, j)=(0, 1)) does not pass the activation input on to another tile. By skipping tiles, it is possible, in some implementations, to improve the ASIC chip 500 performance by reducing the data path length and resulting data latency by half.

As explained herein, in some implementations, one or more of the tiles 502 are dedicated to storing control information. That is, the tiles 502 dedicated to storing control information do not take part in performing calculations on input data such as weight inputs and activation inputs. Control information can include, e.g., control data for configuring the controllable bus lines during operation of the ASIC chip 500 so that data can be moved around the ASIC chip 500. The control data can be provided to the controllable bus lines in the form of control signals for controlling the conveyer elements and multiplexers of the controllable bus lines. The control data specifies whether particular conveyer elements of the controllable bus lines pass data to a next conveyer element of the controllable bus line so that data is transferred among the tiles according to a predetermined schedule. The control data additionally specifies whether data is transferred from or to a bus line. For example, the control data can include control signals that direct a multiplexer to transfer data from a bus line to memory and/or other circuitry within a tile. In another example, the control data can include control signals that direct a multiplexer to transfer data from the memory and/or circuitry within the tile to the bus line. In another example, the control data can include control signals that direct a multiplexer to transfer data between a bus line and the communications interface 508 and/or between the bus line and the vector processing unit 504. Alternatively, as disclosed herein, dedicated control tiles are not used. Rather, in such cases, the local memory of each tile stores the control information for that particular tile.

Figure 6:
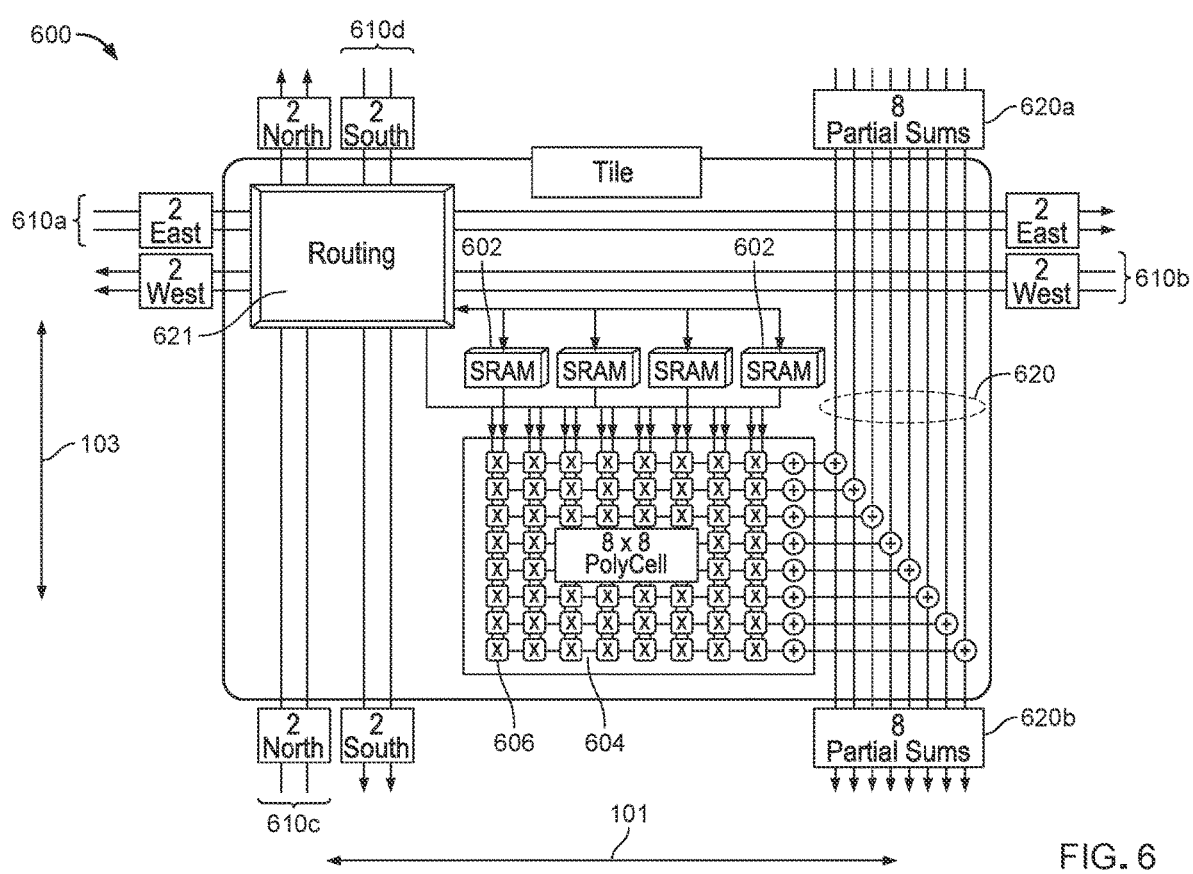
FIG. 6 illustrates an example of a tile.

FIG. 6 illustrates an example of a tile 600 for use in the ASIC chip 500. Each tile 600 includes local memory 602 and a computational array 604 coupled to the memory 602. The local memory 602 includes physical memory positioned proximate to the computational array 604. The computational array 604 includes multiple cells 606. Each cell 606 of the computational array 604 includes circuitry configured to perform a computation (e.g., a multiply and accumulate operation) based on data inputs, such as activation inputs and weight inputs, to the cell 606. Each cell can perform the computation (e.g., the multiply and accumulation operation) on a cycle of the clock signal. The computational array 604 can have more rows than columns, more columns than rows, or an equal number of columns and rows. For instance, in the example shown in FIG. 6, the computational array 604 includes 64 cells arranged in 8 rows and 8 columns. Other computational array sizes are also possible, such as computational arrays having 16 cells, 32 cells, 128 cells, or 256 cells, among others. Each tile can include the same number of cells and/or the same size computational array. The total number of operations that can be performed in parallel for the ASIC chip then depends on the total number of tiles having the same size computational array within the chip. For example, for the ASIC chip 500 shown in FIG. 5, which contains approximately 1150 tiles, this means that approximately 72,000 computations can be performed in parallel every cycle. Examples of clock speeds that may be used include, but are not limited to, 225 MHz, 500 MHz, 750 MHz, 1 GHz, 1.25 GHz, 1.5 GHz, 1.75 GHz, or 2 GHz. The computational arrays 604 of each individual tile is a subset of the larger systolic array of tiles, as illustrated in FIG. 5.

The memory 602 contained in the tile 600 can include, e.g., random-access memory (RAM), such as SRAM. Other memory can be used instead. Each memory 602 can be configured to store $(1/n)^{th}$ of the total memory associated with n tiles 502 of the ASIC chip illustrated in FIG. 5. The memory 602 can provided as a single chip or in multiple chips. For example, memory 602 shown in FIG. 6 is provided as four single-port SRAMs, each of which is coupled to the computational array 604. Alternatively, the memory 602 can be provided as two single-port SRAMs or eight single-port SRAMS, among other configurations. The joint capacity of the memory can be, but is not limited to, e.g., 16 kB, 32 kB, 64 kB, or 128 kB, after error correction coding. By providing the physical memory 602 locally to the computational arrays, the density of wiring for the ASIC 500 can be, in some implementations, vastly reduced. In an alternate configuration in which memory is centralized within the ASIC 500, as opposed to provided locally as described herein, may require a wire for each bit of memory bandwidth. The total number of wires needed to cover each tile of the ASIC 500 would far exceed the available space within the ASIC 100. In contrast, with dedicated memory provided for each tile, the total number of required to span the area of the ASIC 500 can be substantially reduced.

The tile 600 also includes controllable bus lines. The controllable bus lines may be categorized into multiple different groups. For example, the controllable bus lines can include a first group of general purpose controllable bus lines 610 configured to transfer data among tiles in each cardinal direction. That is, the first group of controllable bus lines 610 can include: bus lines 610a configured to transfer data toward a first direction along the first dimension 501 of the grid of tiles (referred to as "East" in FIG. 6); bus lines 610b configured to transfer data toward a second direction along the first dimension 101 of the grid of tiles (referred to as "West" in FIG. 6), in which the second direction is opposite to that of the first direction; bus lines 610c configured to transfer data toward a third direction along the second dimension 103 of the grid of tiles (referred to as "North" in FIG. 6); and bus lines 610d configured to transfer data toward a fourth direction along the second dimension 103 of the grid of tiles (referred to as "South" in FIG. 6), in which the fourth direction is opposite to the third direction. General purpose bus lines 610 can be configured to carry control data, activation input data, data from and/or to the communications interface, data from and/or to the vector processing unit, and data to be stored and/or used by the tile 600 (e.g., weight inputs). The tile 600 may include one or more control elements 621 (e.g., flip-flops and multiplexers) for controlling the controllable bus lines, and thus routing data to and/or from the tile 600 and/or from memory 602.

The controllable bus lines also can include a second group of controllable bus lines, referred to herein as computational array partial sum bus lines 620. The computational array partial sum bus lines 620 can be configured to carry data output from computations performed by the computational array 604. For example, the bus lines 620 can be configured to carry partial sum data obtained from the rows in the computational array 604, as shown in FIG. 6. In such case, the number of bus lines 620 would match the number of rows in the array 604. For instance, for a 8×8 computational array, there would be 8 partial sum bus lines 620, each of which is coupled to the output of a corresponding row in the computational array 604. The computational array output bus lines 620 can be further configured to couple to another tile within the ASIC chip, e.g., as inputs to a computational array of another tile within the ASIC chip. For example, the array partial sum bus lines 620 of tile 600 can be configured to receive inputs (e.g., partial sums 620a) of a computational array of a second tile that is located at least one tile away from the tile 600. The outputs of computational array 604 then are added to the partial sum lines 620 to produce new partial sums 620b, which may be output from the tile 600. The partial sums 620b then may be passed to another tile or, alternatively, to the vector processing unit. For example, each bus line 620 may be coupled to a corresponding segment (such as segments 506 in FIG. 5) of the vector processing unit.

As explained with respect to FIG. 5, the controllable bus lines can include circuitry such as conveyer elements (e.g., flip-flops) configured to allow data to be conveyed along the bus lines. In some implementations, each controllable bus line includes, for each tile, a corresponding conveyer element. As further explained with respect to FIG. 5, the controllable bus lines can include circuitry such as multiplexers configured to allow data to be transferred among the different tiles, the vector processing unit and the communications interface of the ASIC chip. The multiplexers can be located wherever there is a source or sink for data. For example, in some implementations, as shown in FIG. 6, control circuitry 621, such as multiplexers, can be located at crossings of controllable bus line (e.g., at the crossing of general purpose bus lines 610a and 610d, at the crossing of general purpose bus lines 610a and 610c, at the crossing of general purpose bus lines 610b and 610d, and/or at the crossing of general purpose bus lines 610b and 610c). The multiplexers at the bus line crossings can be configured to transfer data between the bus lines at the crossings. Accordingly, by proper operation of the multiplexers, it can be possible to change the direction in which data travels over the controllable bus lines. For example, data traveling along the first dimension 101 on general purpose bus lines 610a can be transferred to general purpose bus lines 610d, such that the data instead travels along the second dimension 103. In some implementations, multiplexers can be located adjacent to the memory 602 of the tile 600 so that data can be transferred to and/or from memory 602.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

Embodiment 1 is a method comprising:
  receiving an intermediate representation of a program that specifies a plurality of operations to be performed by a plurality of respective components of a synchronous processor, wherein the intermediate representation assigns, to each operation of the plurality of operations, a respective clock cycle value at which the operation is scheduled to be executed by the synchronous processor;
  processing the intermediate representation to generate a respective update window for each operation in the intermediate representation requiring a hardware configuration update, wherein the update window specifies a time range during which a configuration update instruction can be executed to effectuate the hardware configuration update;
  obtaining one or more configuration constraints for the synchronous processor; and
  generating and scheduling configuration update instructions that each occur during one of the update windows and according to the configuration constraints of the synchronous processor.

Embodiment 2 is the method of embodiment 1, wherein the configuration constraints comprise a maximum number of configuration update instructions that the synchronous processor can execute on a single cycle.

Embodiment 3 is the method of embodiment 2, wherein the configuration constraints comprise a limited number of cycles on which configuration update instructions can be executed.

Embodiment 4 is the method of any one of embodiments 1-3, wherein generating and scheduling configuration update instructions from the update windows and configuration constraints comprises allocating configuration update instructions to maximally constrained update windows before allocating configuration update instructions to other update windows.

Embodiment 5 is the method of any one of embodiments 1-4, wherein one or more of the configuration update instructions change the register of a read operation.

Embodiment 6 is the method of any one of embodiments 1-5, wherein one or more of the configuration update instructions changes a multiplexor argument in a data pathway of the synchronous processor.

Embodiment 7 is the method of any one of embodiments 1-6, wherein the synchronous processor is configured to execute each operation with the same configuration if no configuration update instruction has been issued.

Embodiment 8 is the method of any one of the preceding embodiments, further comprising performing the operations with the synchronous processor and updating the configuration of the synchronous processor in accordance with the configuration update instructions.

Embodiment 9 is a method comprising:
  receiving a program that specifies a plurality of operations to be performed by a plurality of respective components of a synchronous processor;
  obtaining, for each component of the plurality of components, a respective clock latency value for each respective operation of the program to be performed by the component;
  generating clock timing constraints for executing the program based on the respective clock latency values for each respective operation of the program; and
  generating, based on the clock timing constraints, an intermediate representation of the program that assigns a respective clock cycle value to each operation of the plurality of operations.

Embodiment 10 is the method of embodiment 9, wherein the operations further comprise:
processing the intermediate representation to generate a respective update window for each operation in the intermediate representation requiring a hardware configuration update, wherein the update window specifies a time range during which a configuration update instruction can be executed to effectuate the hardware configuration update;
obtaining one or more configuration constraints for the synchronous processor;
generating and scheduling configuration update instructions that each occur during one of the update windows and according to the configuration constraints of the synchronous processor.

Embodiment 11 is the method of embodiment 10, wherein the configuration constraints comprise a maximum number of configuration update instructions that the synchronous processor can execute on a single cycle.

Embodiment 12 is the method of embodiment 11, wherein the configuration constraints comprise a limited number of cycles on which configuration update instructions can be executed.

Embodiment 13 is the method of embodiment 10, wherein generating and scheduling configuration update instructions from the update windows and configuration constraints comprises allocating configuration update instructions to maximally constrained update windows before allocating configuration update instructions to other update windows.

Embodiment 14 is the method of any one of embodiments 9-13, wherein the program is latency insensitive.

Embodiment 15 is the method of embodiment 14, wherein the program does not specify an ordering of operations or timings between the operations.

Embodiment 16 is the method of embodiment 15, wherein the program does not specify latency information for components of the synchronous processor.

Embodiment 17 is the method of any one of embodiments 9-16, wherein the intermediate representation of the program can assign negative clock cycle values to each operation of the plurality of operations.

Embodiment 18 is the method of any one of embodiments 9-17, wherein the operations further comprise generating dependency information between operations from the variables in the input program.

Embodiment 19 is a system comprising one or more computers and one or more storage devices storing instructions that are operable, when executed by the one or more computers, to cause the one or more computers to perform the method of any one of the preceding embodiments.

Embodiment 20 is a a computer storage medium encoded with a computer program, the program comprising instructions that are operable, when executed by data processing apparatus, to cause the data processing apparatus to perform the method of any one of embodiments 1 to 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
receiving an intermediate representation of a program that specifies a plurality of operations to be performed by a synchronous processor;
for each operation of the plurality of operations: assigning, to the operation and using the intermediate representation, a respective clock cycle value that indicates when the operation will be executed by the synchronous processor;
for each operation in the intermediate representation that requires a hardware configuration update: generating a respective update window in response to processing the intermediate representation, wherein the update window specifies a time range for executing a configuration update instruction and performing the hardware configuration update;
obtaining configuration constraints for the synchronous processor;
generating configuration update instructions based on the configuration constraints;
scheduling each of the configuration update instructions to occur during one of the update windows and according to the configuration constraints; and
in the absence of a configuration update instruction being issued, executing, by the synchronous processor, each operation by using a same or prior configuration.

2. The method of claim 1, wherein the configuration constraints comprise a maximum number of configuration update instructions that are executable by the synchronous processor on a single cycle.

3. The method of claim 2, wherein the configuration constraints comprise a limited number of cycles on which configuration update instructions are to be executed.

4. The method of claim 2, wherein:
generating configuration update instructions and scheduling each of the configuration update instructions comprises allocating configuration update instructions to maximally constrained update windows before allocating configuration update instructions to other update windows.

5. The method of claim 4, wherein one or more of the configuration update instructions change a register of a read operation.

6. The method of claim 5, wherein one or more of the configuration update instructions changes a multiplexor argument in a data pathway of the synchronous processor.

7. The method of claim 1, further comprising:
performing the plurality of operations with the synchronous processor; and
updating a configuration of the synchronous processor in accordance with the configuration update instructions.

8. A method comprising:
receiving a program that specifies a plurality of operations to be performed by a plurality of respective components of a synchronous processor;
for each component of the plurality of components: computing a respective clock latency value for each respective operation of the program to be performed by the component;
generating clock timing constraints for executing the program based on the respective clock latency values for each respective operation of the plurality of operations specified by the program;
generating, based on the clock timing constraints, an intermediate representation of the program; and
assigning, by the intermediate representation, a respective clock cycle value to each operation of the plurality of operations, wherein assigning the respective clock cycle value to each operation comprises examining dependencies of nodes in the intermediate representation and determining the respective clock cycle value for each operation based on the dependencies of the nodes.

9. The method of claim 8, further comprising:
for each operation in the intermediate representation that requires a hardware configuration update: generating a respective update window in response to processing the intermediate representation, wherein the update window specifies a time range for executing a configuration update instruction and performing the hardware configuration update;
obtaining configuration constraints for the synchronous processor;
generating configuration update instructions based on the configuration constraints; and
scheduling each of the configuration update instructions to occur during one of the update windows and according to the configuration constraints.

10. The method of claim 9, wherein the configuration constraints comprise a maximum number of configuration update instructions that the synchronous processor is operable to execute on a single cycle.

11. The method of claim 10, wherein the configuration constraints comprise a limited number of cycles on which configuration update instructions are to be executed.

12. The method of claim 9, wherein:
generating configuration update instructions and scheduling each of the configuration update instructions comprises allocating configuration update instructions to maximally constrained update windows before allocating configuration update instructions to other update windows.

13. The method of claim 12, wherein the program is latency insensitive.

14. The method of claim 13, wherein the program does not specify an ordering of operations or timings between the operations.

15. The method of claim 14, wherein the program does not specify latency information for components of the synchronous processor.

16. The method of claim 15, wherein the intermediate representation of the program is configured to assign negative clock cycle values to each operation of the plurality of operations.

17. The method of claim 16, wherein the operations further comprise generating dependency information between operations from the variables in the input program.

* * * * *